US012221118B2

(12) United States Patent
Wang et al.

(10) Patent No.: US 12,221,118 B2
(45) Date of Patent: Feb. 11, 2025

(54) KNOWLEDGE DISTILLATION FOR AUTONOMOUS VEHICLES

(71) Applicant: Waymo LLC, Mountain View, CA (US)

(72) Inventors: Minfa Wang, Los Altos, CA (US); Kai Ding, Santa Clara, CA (US); Haoyu Chen, Sunnyvale, CA (US); Wei Chai, Cupertino, CA (US); Maher Mneimneh, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 615 days.

(21) Appl. No.: 17/013,298

(22) Filed: Sep. 4, 2020

(65) Prior Publication Data
US 2022/0073085 A1  Mar. 10, 2022

(51) Int. Cl.
*G01C 22/00* (2006.01)
*B60W 50/00* (2006.01)
(Continued)

(52) U.S. Cl.
CPC ....... *B60W 50/0098* (2013.01); *G06F 18/254* (2023.01); *G06N 3/04* (2013.01); *G06N 20/00* (2019.01); *B60W 2540/22* (2013.01)

(58) Field of Classification Search
CPC .......... B60W 50/0098; B60W 2540/22; G06N 20/00; G06N 3/04; G06K 9/6292
See application file for complete search history.

(56) References Cited

U.S. PATENT DOCUMENTS

| 10,322,728 | B1* | 6/2019 | Porikli | G06V 10/764 |
|---|---|---|---|---|
| 2019/0232974 | A1* | 8/2019 | Reiley | G06V 40/168 |

(Continued)

FOREIGN PATENT DOCUMENTS

| CN | 107180220 | 9/2017 |
|---|---|---|
| CN | 110379193 | 10/2019 |

(Continued)

OTHER PUBLICATIONS

Extended Search Report and Written Opinion in European Appln. No. 21186979.7, dated Feb. 4, 2022, 11 pages.
(Continued)

*Primary Examiner* — Adam M Alharbi
(74) *Attorney, Agent, or Firm* — Fish & Richardson P.C.

(57) ABSTRACT

Methods, systems, and apparatus, including computer programs encoded on computer storage media, for performing knowledge distillation for autonomous vehicles. One of the methods includes obtaining sensor data characterizing an environment, wherein the sensor data has been captured by one or more sensors on-board a vehicle in the environment; processing, for each of one or more surrounding agents in the environment, a network input generated from the sensor data using a neural network to generate an agent discomfort prediction that characterizes a level of discomfort of the agent; combining the one or more agent discomfort predictions to generate an aggregated discomfort score; and providing the aggregated discomfort score to a path planning system of the vehicle in order to generate a future path of the vehicle.

20 Claims, 7 Drawing Sheets

ENVIRONMENT 200

(51) Int. Cl.
G06F 18/25 (2023.01)
G06N 3/04 (2023.01)
G06N 20/00 (2019.01)

(56) References Cited

U.S. PATENT DOCUMENTS

| | | | |
|---|---|---|---|
| 2020/0210726 A1* | 7/2020 | Yang | G06V 10/454 |
| 2020/0276988 A1 | 9/2020 | Graves | |
| 2021/0070320 A1 | 3/2021 | Nagaraja et al. | |
| 2021/0213961 A1* | 7/2021 | Ding | G06N 3/08 |
| 2022/0126864 A1* | 4/2022 | Moustafa | B60W 60/0057 |
| 2022/0188667 A1* | 6/2022 | Burisch | G08G 1/166 |

FOREIGN PATENT DOCUMENTS

| | | |
|---|---|---|
| CN | 110850880 | 2/2020 |
| CN | 111126592 | 5/2020 |
| CN | 111252061 | 6/2020 |
| WO | WO 2020/094264 | 5/2020 |

OTHER PUBLICATIONS

Office Action in Chinese Appln. No. 202111009604.9, dated Nov. 13, 2024, 27 pages (with English translation).

* cited by examiner

KNOWLEDGE DISTILLATION FOR AUTONOMOUS VEHICLES

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on inputs to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the neural network thus involves continually performing a forward pass on the input, computing gradient values, and updating the current values for the set of parameters for each layer using the computed gradient values, e.g., using gradient descent. Once a neural network is trained, the final set of parameter values can be used to make predictions in a production system.

SUMMARY

This specification describes how a system on-board a vehicle in an environment, e.g., an autonomous or semi-autonomous vehicle, can generate a prediction of a level of discomfort that the vehicle is imposing onto surrounding agents in the environment. In particular, for each of one or more surrounding agents, the system can generate an agent discomfort prediction characterizing the level of discomfort imposed by the vehicle onto the agent. The system can then combine the one or more respective agent discomfort predictions to generate an aggregated discomfort score, and use the aggregated discomfort score to make autonomous driving decisions.

In this specification, the "discomfort" of a vehicle or agent is an estimate of how comfortable a human driver or human passenger would feel in the current state of the vehicle or agent. For example, a human in a vehicle may feel discomfort if the vehicle brakes abruptly, i.e., if the acceleration or deceleration of the vehicle exceeds a particular threshold. As another example, a human in a first vehicle may feel discomfort if a second vehicle is too close to the first vehicle, i.e., if the distance between the two vehicles is below a particular threshold. As another example, a human in a vehicle may feel discomfort if the vehicle swerves, wobbles, or is creeping within the vehicle's lane. As another example, a human in a vehicle may feel discomfort if the vehicle does not proceed when it is the vehicle's turn at a four-way stop sign.

In this specification, discomfort is "imposed" upon an agent by a vehicle if the driving behavior of the vehicle is causing the discomfort of the agent; that is, if the vehicle were not in the environment, then the agent would not experience the discomfort.

This specification also describes how a training system can train an agent discomfort model, e.g., a neural network, to generate agent discomfort predictions, i.e., predictions of the level of discomfort imposed by a vehicle on surrounding agents.

For example, the training system can train the agent discomfort model using training data characterizing the vehicle itself, and training labels characterizing the discomfort level of the vehicle itself; i.e., the training system can treat the training data and training labels as if they characterized surrounding agents, and train the agent discomfort model to generate predictions regarding surrounding agents. Because a vehicle can directly determine its own discomfort level, and cannot determine the discomfort level of surrounding agents, using training labels characterizing the vehicle allows the training system to execute supervised learning.

In particular, the training system can obtain training examples generated from sensor data collected by vehicles operating in the real world. The training examples can include training labels characterizing a discomfort level of the vehicle at the time the sensor data was collected. The training system can process the training examples using an agent feature extractor to generate vehicle feature data characterizing the vehicle at the time the sensor data was collected. The system can then process the vehicle feature data to generate vehicle discomfort predictions characterizing a predicted level of discomfort of the vehicle, and update the parameters of the agent discomfort model according to an error between the vehicle discomfort predictions and the training labels. Thus, the training system can train the agent discomfort model to receive agent feature data characterizing a surrounding agent and to generate the agent discomfort predictions.

The agent feature extractor can be configured to extract feature data characterizing surrounding agents from sensor data captured by a vehicle. During training, the training system can use the agent feature extractor to generate feature data characterizing the vehicle itself, as if it were a surrounding agent. Then, at inference time, a vehicle can use the agent feature extractor to generate feature data characterizing each surrounding agent in the environment, and then process the feature data using the trained agent discomfort model to predict the discomfort level of the surrounding agents. That is, during training the agent feature extractor can be configured to process sensor data captured by sensors of the vehicle to generate a representation of the vehicle that matches a representation of surrounding agents that the agent feature extractor will generate at inference time from the sensor data.

In this specification, a feature extractor is a system that is configured to receive input data and to process the input data to generate output data that is in a form that is usable by a downstream model, i.e., that is in a form that the downstream model is configured to receive as input. For example, the agent feature extractor is configured to receive sensor data captured by a vehicle and to generate feature data characterizing a surrounding agent that can be processed by the agent discomfort model.

As another example, the training system can first train a vehicle discomfort model that is configured to receive vehicle feature data characterizing a vehicle generated from sensor data captured by one or more sensors on-board the vehicle, and to generate a prediction of the discomfort level of the vehicle. To train the vehicle discomfort model, the training system can use training labels characterizing the discomfort level of the vehicle captured directly from the vehicle. Then, the training system can process agent feature data characterizing a surrounding agent generated from sensor data captured by one or more sensors on-board the vehicle using the vehicle discomfort model to generate training labels characterizing the discomfort level of the surrounding agent. The training system can then use the generated training labels, and the agent feature data, to train an agent discomfort model configured to receive agent feature data and to generate a prediction of the discomfort level of the vehicle. That is, the training system can use model distillation to train the agent discomfort model, where the agent discomfort model is the "teacher" model and the agent discomfort model is the "student" model.

The training system described in this specification can be used to train many different agent models configured to generate predictions characterizing surrounding agents in the environment, in addition to agent discomfort models. For example, the training system can be configured to train an agent safety model configured to predict whether the vehicle is imposing an unsafe condition onto one or more surrounding agents. As another example, the training system can be configured to train an agent progress model configured to predict whether the vehicle is causing one or more surrounding agents not to progress along their route as quickly or efficiently as desired.

Particular embodiments of the subject matter described in this specification can be implemented so as to realize one or more of the following advantages.

When an autonomous or semi-autonomous vehicle is operating in an environment, it is important that the vehicle can predict how other agents in the environment will respond to the driving behavior of the vehicle. In particular, it is important for the vehicle to predict whether its behavior is causing discomfort to other agents. Using techniques described in this specification, a system can generate individual agent discomfort predictions that characterize a level of discomfort imposed by the vehicle on individual surrounding agents, and an aggregate discomfort score characterizing a cumulative level of discomfort imposed by the vehicle on agents in the environment.

An autonomous or semi-autonomous vehicle typically has a greater volume of data, and more accurate data, characterizing itself than data characterizing surrounding agents. It can therefore be difficult to train a system to predict the current state or future behavior of other agents. Using techniques described in this specification, a training system can leverage the data available characterizing the vehicle to train models to generate predictions characterizing surrounding agents.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use a trained machine learning model to generate a prediction of a level of discomfort that the vehicle is imposing onto surrounding agents in the environment.

Figure 1:
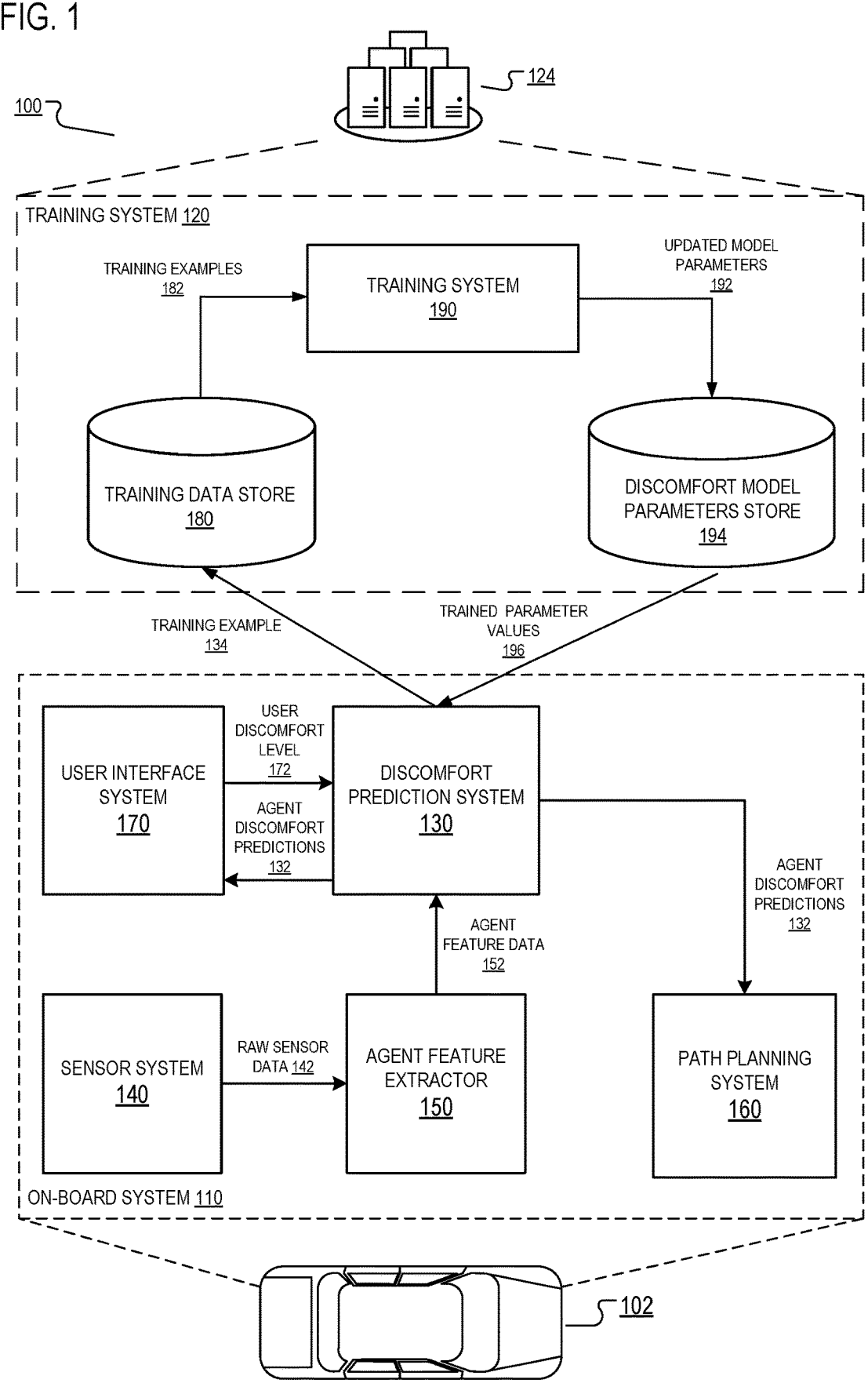
FIG. 1 is a diagram of an example system.

FIG. 1 is a diagram of an example system 100. The system 100 includes an on-board system 110 and a training system 120.

The on-board system 110 is located on-board a vehicle 102. The vehicle 102 in FIG. 1 is illustrated as an automobile, but the on-board system 102 can be located on-board any appropriate vehicle type. The vehicle 102 can be a fully autonomous vehicle that determines and executes fully-autonomous driving decisions in order to navigate through an environment. The vehicle 102 can also be a semi-autonomous vehicle that uses predictions to aid a human driver. For example, the vehicle 102 can autonomously apply the brakes if a prediction indicates that a human driver is about to collide with another vehicle.

The on-board system 110 includes one or more sensor subsystems 140. The sensor subsystems 140 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 140 or other components of the vehicle 102 can also classify groups of one or more raw sensor measurements from one or more sensors as being measures of another agent. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. Each group of camera sensor measurements can be represented as an image patch, e.g., an RGB image patch.

Once the sensor subsystems 140 classify a one or more groups of raw sensor measurements as being measures of respective surrounding agents, the sensor subsystems 140 can compile the raw sensor measurements into a set of raw data 142, and send the raw data 142 to an agent feature extractor 150.

The agent feature extractor 150, also on-board the vehicle 102, receives the raw sensor data 142 from the sensor system 140 and generates agent feature data 152. The agent feature data 152 includes, for each of one or more identified surrounding agents in the environment of the vehicle 102, data characterizing the agent. For example, for a particular agent, the agent feature data 152 can include a top-down image of the environment, e.g., a top-down image centered around the agent. As another example, for a particular agent, the agent feature data 152 can include motion parameters of the agent (e.g., a velocity of the agent, an acceleration of the agent, and/or a jerk of the agent), a size of the agent, and/or a distance between the agent and the vehicle 102. As another example, for a particular agent, the agent feature data 152 can include a current location of the agent and/or a predicted future location of the agent, e.g., a predicted future location of the agent generated by an agent prediction system of the vehicle 102. As another example, the agent feature date 152 can include feature of the environment, e.g., a roadgraph of the environment. In this specification, a roadgraph is data representing the known features of the environment, e.g., a top-down image of the environment, that can include representation of the features of the roads in the environment such as the lanes of the road, cross walks, traffic lights, stop signs, etc. In some implementations, the agent feature data 152 can include one or more features derived from raw data captured of the environment; for example, for a particular agent, the agent feature data 152 can include features representing one or more of: whether the agent is currently making a turn, whether the agent is currently in an intersection, or what the current state of a traffic light is.

In some implementations, the agent feature data 152 is human interpretable, i.e., every element of the agent feature data 152 can have a real-world meaning, e.g., scalar velocity or acceleration. In some other implementations, the agent feature data 152 is not human interpretable, e.g., the agent feature data corresponding to a particular agent can be a learned embedding of the raw sensor data 142. In this specification, an embedding is an ordered collection of numeric values that represents an input in a particular embedding space. For example, an embedding can be a vector of floating point or other numeric values that has a fixed dimensionality.

The agent feature extractor 150 provides the agent feature data 152 to a discomfort prediction system 130, also on-board the vehicle 102. The discomfort prediction system 130 uses the agent feature data 152 to generate, for each of the one or more identified surrounding agents, an agent discomfort prediction 132 characterizing a level of discomfort imposed by the vehicle 102 onto the agent. For example, the agent discomfort prediction 132 for a particular agent can be a floating point value between 0 and 1, where 0 is the lowest discomfort level and 1 is the highest discomfort level.

In some implementations, the discomfort prediction system 130 also combines the one or more agent discomfort predictions 132 to generate an aggregate discomfort score characterizing the collective discomfort imposed by the vehicle 102 onto surrounding agents in the environment. This process is discussed in more detail below with reference to FIG. 4.

The discomfort prediction system 130 can provide the agent discomfort predictions 132 and/or the aggregation discomfort score to a path planning system 160, a user interface system 170, or both.

The path planning system 160, also on-board the vehicle 102, generates a planned vehicle path that characterizes a path that the vehicle 102 will take in the future. When the path planning system 160 receives the agent discomfort predictions 132, the path planning system 160 can use the agent discomfort predictions 132 to generate a new planned vehicle path that characterizes a path that the vehicle 102 will take in the future. For example, the agent discomfort predictions 132 may identify a particular surrounding agent that the vehicle 102 is causing discomfort, e.g., by driving too close to the surrounding agent. In this example, the path planning system 160 can generate a new planned vehicle path that navigates the vehicle 102 farther away from the surrounding agent, relieving the discomfort imposed on the surrounding agent.

When the user interface system 170 receives the agent discomfort predictions 132, the user interface system 170 can use the agent discomfort predictions 132 to present information to the driver of the agent 102 to assist the driver in operating the agent 102 safely. The user interface system 170 can present information to the driver of the agent 102 by any appropriate means, for example, by an audio message transmitted through a speaker system of the agent 102 or by alerts displayed on a visual display system in the agent (e.g., an LCD display on the dashboard of the agent 102). In a particular example, the agent discomfort predictions 132 may identify particular surrounding agent that the vehicle 102 is causing discomfort. In this example, the user interface system 170 can present an alert message to the driver of the agent 102 with instructions to adjust the trajectory of the agent 102 to relieve the imposed discomfort or notifying the driver of the agent of the imposed discomfort.

In some implementations, the user interface system can collect user feedback about the level 172 of discomfort of the vehicle 102. That is, the user can provide the user discomfort level 172 that characterizes the current discomfort of the user as a passenger of the vehicle 102. For example, the vehicle 102 can provide an interface for the driver or a passenger of the vehicle 102 to identify when an uncomfortable event has happened, and to identify a severity of the discomfort. As a particular example, the user can identify the severity of the discomfort using a scalar user discomfort level 172, e.g., 0.5 for "low," 0.75 for "medium," and 1.0 for "high."

The user interface system 170 can provide the user discomfort level 1762 to the discomfort prediction system 130, for generating a training example 134 for training the discomfort prediction system 130. For example, the discomfort prediction system 130 can generate a training example 134 characterizing the vehicle 102 from the raw sensor data, where the training label corresponding to the training example 134 is the reported user discomfort level 172. The training system 120 can use the training example to train the discomfort prediction system 130 to generate agent discomfort predictions, treating the training example (which characterizes the vehicle 102) as if it characterized a surrounding agent in the environment of the vehicle 102. Example training processes are discussed in more detail below with reference to FIG. 6 and FIG. 7.

To generate the agent discomfort predictions 132, the discomfort prediction system 130 can use trained parameter values 196 that it obtains from a discomfort model parameters store 194 in the training system 120.

The training system 120 is typically hosted within a data center 124, which can be a distributed computing system having hundreds or thousands of computers in one or more locations.

The training system 120 includes a training data store 180 that stores all the training data used to train the parameter values of the discomfort prediction system 130. The training data store 180 receives training examples 134 from agents operating in the real world. For example the training data store 180 can receive a training example 134 from the agent 102 and one or more other agents that are in communication with the training system 120. Example training systems 190 are discussed in more detail below with reference to FIG. 3 and FIG. 4.

The training data store 180 provides training examples 182 to a training system 190, also housed in the training system 120. The training system 190 uses the training examples 182 to update model parameters that will be used by the discomfort prediction system 130, and provides the updated model parameters 192 to the discomfort model parameters store 194. Once the parameter values of the discomfort prediction system 130 have been fully trained, the training system 120 can send the trained parameter values 196 to the discomfort prediction system 130, e.g., through a wired or wireless connection.

Figure 2:
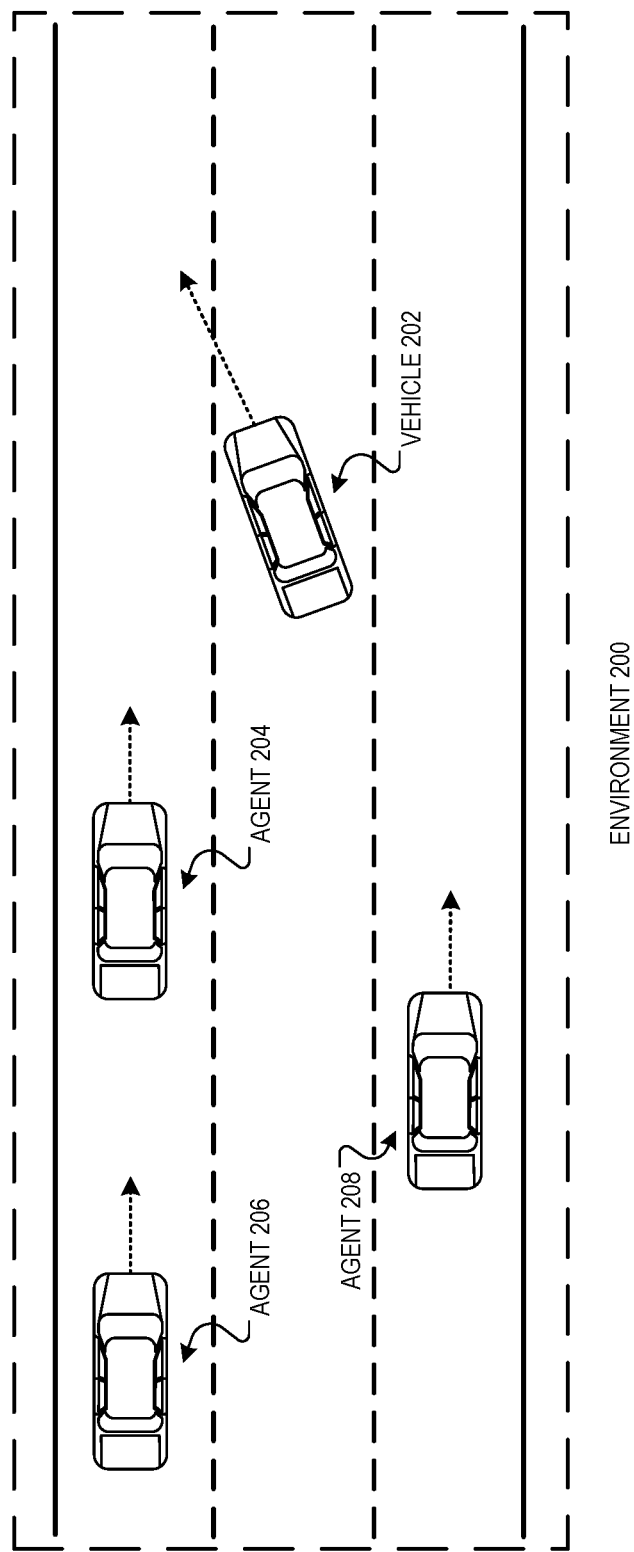
FIG. 2 is an illustration of an example environment containing a vehicle and multiple surrounding agents.

FIG. 2 is an illustration of an example environment 200 containing a vehicle 202 and multiple surrounding agents 204, 206, and 208.

The vehicle 202 is merging into the left lane from the middle lane. While doing so, and/or before doing so, the vehicle 202 can process sensor data captured by one or more sensors on-board the vehicle 202 using a discomfort prediction system, e.g., the discomfort prediction system 130 depicted in FIG. 1, to generate agent discomfort predictions characterizing a level of discomfort imposed by the vehicle 202 onto each of the agents 204, 206, and 208. For example, the agent discomfort predictions might be a scalar value between 0 and 1.

The vehicle 202 might generate a high agent discomfort prediction corresponding to the agent 204, because the vehicle 202 is merging in front of the agent 204. That is, by merging, the vehicle 202 might impose discomfort onto the agent 204, e.g., because of the closeness between the vehicle 202 and the agent 204 or because the merging will require the agent 204 to slow down. For example, the vehicle 202 might generate an agent discomfort prediction of 0.9 corresponding to the agent 204.

The vehicle 202 might generate a medium agent discomfort prediction corresponding to the agent 206, because merging into the left lane might also affect the agent 206. For example, the merging might require the agent 204 to slow down, which in turn will require the agent 206 to slow down. For example, the vehicle 202 might generate an agent discomfort prediction of 0.6 corresponding to the agent 206.

The vehicle 202 might generate a low agent discomfort prediction corresponding to the agent 208, because the vehicle 202 will not impose any discomfort onto the agent 208 (which is in the right lane) by merging into the left lane. For example, the vehicle 202 might generate an agent discomfort prediction of 0.1 corresponding to the agent 208.

Figure 3:
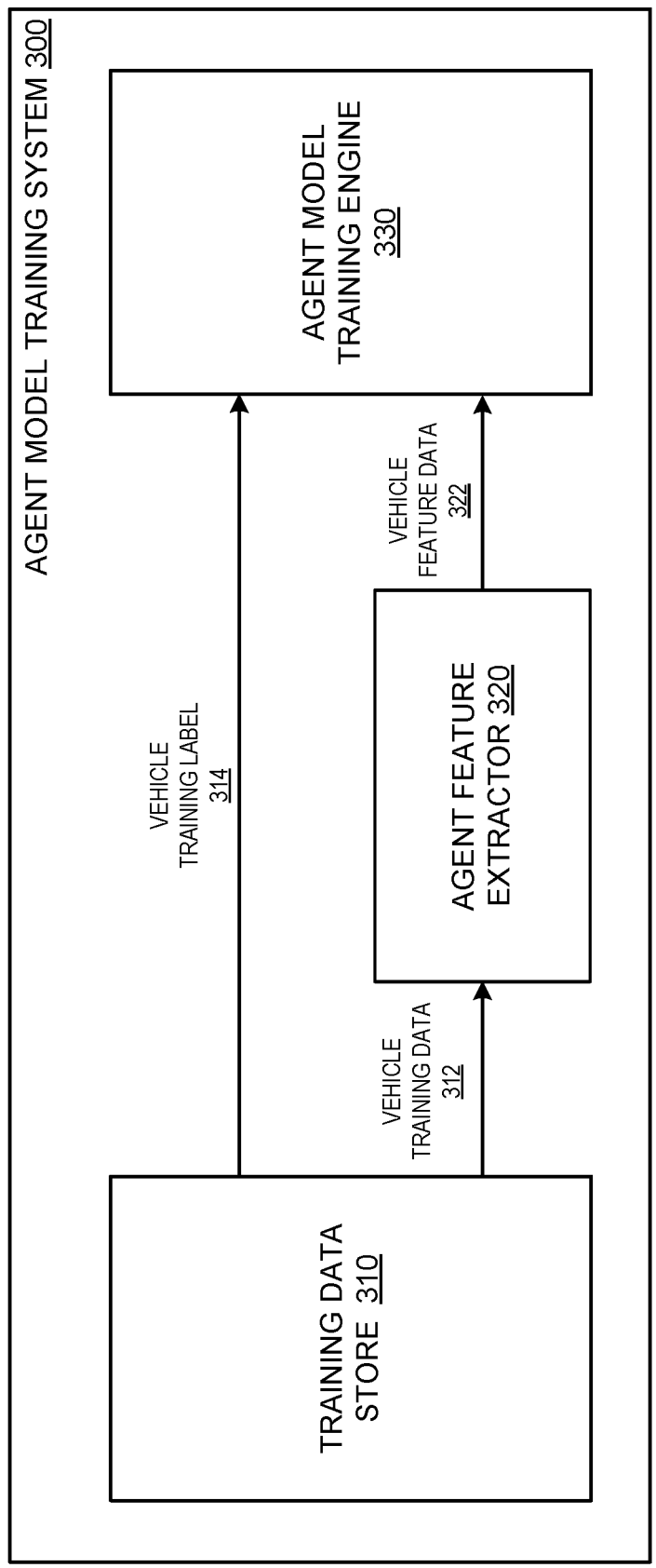
FIG. 3 and FIG. 4 are diagrams of example training systems for training agent models.

FIG. 3 is a diagram of an example training system 300 for training an agent model. The agent model training system 300 is an example of a system implemented as computer programs on one or more computers in one or more locations in which the systems, components, and techniques described below are implemented.

The agent model can be any model configured to receive a model input generated from sensor data captured by one or more sensors on-board a vehicle in an environment, and to process the model input to generate a model output characterizing one or more agents surrounding the vehicle in the environment. That is, the model output of the agent model is a prediction regarding one or more characteristics of the surrounding agents in the environment.

In particular, the agent model is configured to receive, for each of one or more surrounding agents in the environment, agent feature data characterizing the agent generated by an agent feature extractor 320. The agent feature extractor 320 is configured to receive the sensor data captured by the on-board sensors of the vehicle and to process the sensor data to generate the agent feature data characterizing the surrounding agent, where the agent feature data is in the format that the agent model is configured to receive as input.

As a particular example, the agent model can include one or more of a recurrent neural network, a temporal convolutional neural network, or a boosted forest model. In some implementations, the agent model can use one or more feature value smoothing techniques to reduce noise in the agent feature data. For example, the agent model can use a low-pass filter to smooth feature values across time. In some implementations, the agent model can use feature calibration, e.g., applying a transformation to the agent feature data, in order to ensure that the agent feature data has a comparable distribution to the vehicle feature data.

For example, the agent model can be an agent discomfort model that is configured to receive, for each of one or more agents surrounding the vehicle in the environment, agent feature data and to process the agent feature data to generate an agent discomfort prediction characterizing a level of discomfort imposed by the vehicle onto the agent. For example, the agent discomfort model can be the discomfort prediction system 130 depicted in FIG. 1.

As another example, the agent model can be an agent safety model that is configured to receive, for each of one or more agents surrounding the vehicle in the environment, agent feature data and to process the agent feature data to generate an agent safety prediction characterizing a level of safety that the vehicle is imposing onto the agent. That is, the agent safety model generates a prediction of whether the vehicle is causing the surrounding agent to be in an unsafe state or position. For example, the agent safety prediction can be a scalar value between 0 and 1, where 0 corresponds to a prediction that the vehicle is not endangering the surrounding agent at all, and 1 corresponds to a prediction that the vehicle is severely endangering the surrounding agent.

As another example, the agent model can be an agent progress model that is configured to receive, for each of one or more agents surrounding the vehicle in the environment, agent feature data and to process the agent feature data to generate an agent progress prediction characterizing a degree to which the vehicle is causing the agent not to make progress along the agent's intended route. That is, the agent progress model generates a prediction of whether the vehicle is impeding the surrounding agent and causing the surrounding agent to proceed less efficiently or quickly than desired. For example, the agent progress prediction can be a scalar value between 0 and 1, where 0 corresponds to a prediction that the vehicle is not impeding the agent along the agent's route at all, and 1 corresponds to a prediction that the vehicle is severely impeding the agent along the agent's route.

While the below description refers to the case where the agent model is an agent discomfort model, it is to be understood that the below description can apply to an agent model of any appropriate type.

Because the discomfort level of the vehicle is directly observable while the discomfort level of the surrounding agents is not, the agent model training system 300 trains the agent model to generate predictions corresponding to surrounding agents by processing training examples to corresponding to the vehicle itself. That is, the agent model training system trains the agent model using training data characterizing the vehicle itself and training labels characterizing the discomfort level of the vehicle itself, where the training labels are generated from observation of the discomfort level of the vehicle, e.g., using user feedback. The training system 300 treats the training data and training labels as if they characterized surrounding agents, and trains the agent discomfort model to generate predictions regarding surrounding agents.

The agent model training system 300 includes a training data store 310, the agent feature extractor 320, and an agent model training engine 330.

The training data store 310 includes training examples that each include i) vehicle training data 312 that includes sensor data characterizing the vehicle captured by one or more sensors on-board the same vehicle, and ii) a vehicle training label 314 that characterizes a discomfort level of the vehicle at the time the sensor data was collected.

The training data store 310 provides the vehicle training data 312 to the agent feature extractor 320, which processes the vehicle training data 312 to generate vehicle feature data 322 that characterizes the vehicle and that is in the format that the agent model is configured to receive as input. That is, while during inference the agent feature extractor 320 generates agent feature data characterizing a surrounding agent, during training the agent feature extractor 320 generates vehicle feature data 322 that characterizing the vehicle.

For example, if the vehicle feature data includes a top-down image of the environment centered on the vehicle, then during training the agent feature extractor 320 can generate a top-down image centered on the vehicle. Then, during inference, the agent feature extractor 320 can generate agent feature data by translating and/or cropping the top-down image so that is it centered on the surrounding agent.

In some implementations, the agent feature extractor 320 discards a portion of the vehicle training data 312 in order to generate the vehicle feature data 322. The vehicle typically has more data characterizing the vehicle itself than data characterizing surrounding agents; that is, the vehicle training data 312 includes characteristics of the vehicle that are not included in corresponding agent data that would be provided to the agent feature extractor 320 at inference time. Because the agent feature extractor 320 is configured to generate vehicle feature data 322 as if it were generating agent feature data, the agent feature extractor 320 does not include in the vehicle feature data 322 any data characterizing the vehicle that does not correspond to data characterizing the agent that the agent feature extractor 320 will have at inference time. Thus, the agent feature extractor 320 can discard any data in the vehicle training data 312 that does not correspond to agent data that the agent feature extractor 320 will have access to at inference time.

The agent model training engine 330 obtains the vehicle feature data 322 and a vehicle training label 314 and uses them to train the agent model. In particular, the agent model training engine 330 processes the vehicle feature data 322 using the agent model to generate a vehicle discomfort prediction characterizing a predicted discomfort level of the vehicle, and determines an error between the vehicle discomfort prediction and the vehicle training label 314. The agent model training engine then updates the current parameters of the agent model using the determined error, e.g., using backpropagation. Thus, by processing training examples characterizing the vehicle during training, the training system 300 can train the agent model to generate predictions characterizing surrounding agents at inference.

Figure 4:
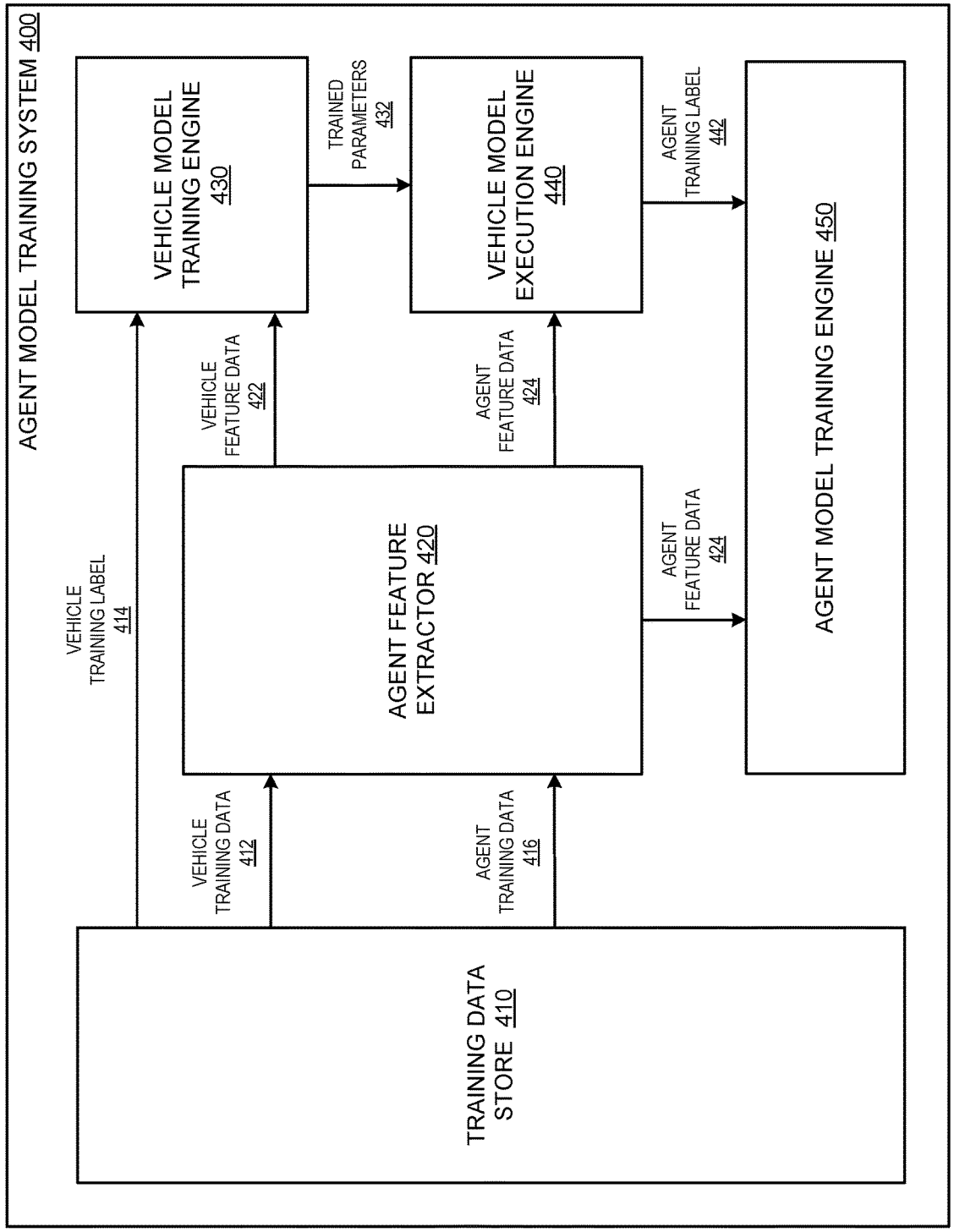

FIG. 4 is a diagram of an example training system 400 for training an agent model. The agent model training system 400 is an example of a system implemented as computer programs on one or more computers in one or more locations in which the systems, components, and techniques described below are implemented.

As described above with reference to FIG. 3, the agent model can be any model configured to receive a model input generated from sensor data captured by one or more sensors on-board a vehicle in an environment, and to process the model input to generate a model output characterizing one or more agents surrounding the vehicle in the environment. In particular, the agent model is configured to receive, for each of one or more surrounding agents in the environment, agent feature data characterizing the agent generated by an agent feature extractor 420.

For example, the agent model can be an agent discomfort models that is configured to receive, for each of one or more surrounding agents, agent feature data and to process the agent feature data to generate an agent discomfort prediction. As another example, the agent model can be an agent safety model that is configured to receive, for each of one or more surrounding agents, agent feature data and to process the agent feature data to generate an agent safety prediction. As another example, the agent model can be an agent progress model that is configured to receive, for each of one or more surrounding agents, agent feature data and to process the agent feature data to generate an agent progress prediction.

While the below description refers to the case where the agent model is an agent discomfort model, it is to be understood that the below description can apply to an agent model of any appropriate type.

The agent model training system 400 is configured first to train a vehicle model that is configured to process vehicle feature data of the same form as the agent feature data and to generate vehicle model output of the same form as the agent model output generated by the agent model. That is, the vehicle feature data and the vehicle model output have the same format and describe the same characteristics as the agent feature data and the agent model output, respectively. The agent model training system 400 can train the vehicle model directly using supervised training because the training system 400 has access to ground-truth vehicle labels captured by the vehicle.

In some implementations, the vehicle model is larger than the agent model, e.g., has more trainable parameters than the agent model. As a particular example, the vehicle model can be a neural network that has more neural network layers than the agent model. In some implementations, the vehicle model receives additional input in addition to vehicle feature data 422; that is, the input to the vehicle model can be larger than the input to the agent model.

After training the vehicle model, the training system 400 uses the vehicle model to generate labels for training the agent model. That is, the training system 400 processes agent feature data characterizing a surrounding agent using the trained vehicle model to generate a vehicle model output characterizing the surrounding agent; this vehicle model output is used as the ground-truth label when training the agent model.

The agent model training system 400 includes a training data store 410, the agent feature extractor 420, a vehicle model training engine 430, a vehicle model execution engine 440, and an agent model training engine 450.

The training data store 410 includes training examples that each include i) vehicle training data 412 that includes sensor data characterizing the vehicle captured by one or more sensors on-board the vehicle, and ii) a vehicle training label 414 that characterizes a discomfort level of the vehicle at the time the sensor data was collected.

The training data store 410 provides the vehicle training data 412 to the agent feature extractor 420, which processes the vehicle training data 412 to generate vehicle feature data 422 that characterizes the vehicle and that is in the format that the vehicle model is configured to receive as input.

As described above with reference to FIG. 3, in some implementations, the agent feature extractor 420 discards a portion of the vehicle training data 412 in order to generate the vehicle feature data 422. The vehicle training data 412 can include characteristics of the vehicle that are not included in corresponding agent training data 416. Because the agent feature extractor 420 is configured to generate vehicle feature data 422 as if it were generating agent feature data, the agent feature extractor 420 does not include in the vehicle feature data 422 any data characterizing the vehicle that does not correspond to data characterizing the agent available in the agent training data 416.

The vehicle model training engine 430 obtains the vehicle feature data 422 and a vehicle training label 414 and uses them to train the vehicle model. In particular, the vehicle model training engine 430 processes the vehicle feature data 422 using the agent model to generate a vehicle discomfort prediction characterizing a predicted discomfort level of the vehicle, and determines an error between the vehicle discomfort prediction and the vehicle training label 414. The vehicle model training engine 430 then updates the current parameters of the vehicle model using the determined error, e.g., using backpropagation.

At the end of training the vehicle model, the vehicle model training engine 430 provides the trained parameters 432 of the vehicle model to the vehicle model execution engine 440, which is configured to receive either vehicle feature data or agent feature data and to process the received feature data using the vehicle model to generate a vehicle model output.

The training data store 410 also includes agent training data 416 that includes sensor data characterizing a surrounding agent captured by one or more sensors on-board the vehicle. In some implementations, the vehicle training data 412 and the agent training data 416 are the same; that is, for a given vehicle at a given time point, the vehicle training data 412 characterizing the vehicle and the agent training data 4116 characterizing a surrounding agent in the environment is the same, e.g., is a collection of all sensor data captured by on-board sensors of the vehicle at the given time point.

The training data store 410 provides the agent training data 416 to the agent feature extractor, which processes the agent training data 416 to generate agent feature data 424 that characterizes the surrounding agent and that is in the format that the agent model is configured to receive as input.

The agent feature extractor 420 provides the agent feature data 424 to the vehicle model execution engine 440, which processes the agent feature data 424 (which characterizes the surrounding agent) as if the agent feature data 424 characterized the vehicle, and generates a vehicle model output characterizing a predicted discomfort level of the surrounding agent. The training system 400 determines this vehicle model output to be the agent training label 442 that will be used as the ground-truth discomfort level when training the agent model.

The agent model training engine 450 obtains the agent feature data 424 and an agent training label 442 and uses them to train the agent model. In particular, the agent model training engine 450 processes the agent feature data 424 using the agent model to generate an agent discomfort prediction characterizing a predicted discomfort level of the agent, and determines an error between the agent discomfort prediction and the agent training label 442. The agent model training engine 450 then updates the current parameters of the agent model using the determined error, e.g., using backpropagation.

Figure 5:
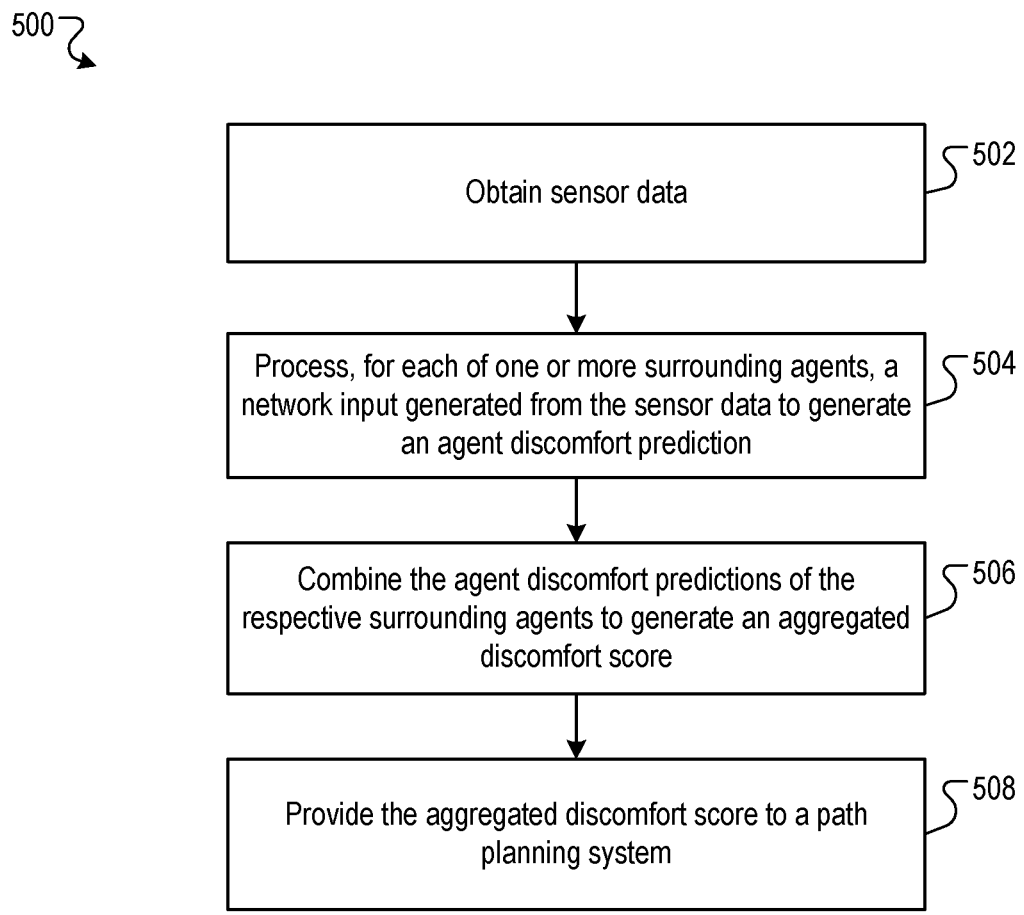
FIG. 5 is a flow diagram of an example process for determining the discomfort imposed on surrounding agents by a vehicle.

FIG. 5 is a flow diagram of an example process 500 for determining the discomfort imposed on surrounding agents by a vehicle in an environment. For convenience, the process 500 will be described as being performed by a system of one or more computers located in one or more locations. For example, a discomfort prediction system, e.g., the discomfort prediction system 130 depicted in FIG. 1, appropriately programmed in accordance with this specification, can perform the process 500.

The system obtains sensor data characterizing the environment (step 502). The sensor data has been captured by one or more sensors on-board a vehicle in the environment.

The system processes, for each of one or more surrounding agents in the environment, a network input generated from the sensor data to generate an agent discomfort prediction (step 504). For example, the system can process the network input using a deep neural network. The agent discomfort prediction characterizes a level of discomfort imposed by the vehicle onto the agent. In some implementations, the network input is a machine-learned input, e.g., the network input can be learned concurrently with the training of the neural network.

The system combines the agent discomfort predictions of the respective surrounding agents to generate an aggregated discomfort score (step 506). For example, the system can determine a mean, median, minimum, or maximum of the agent discomfort predictions to generate the aggregated discomfort score.

As another example, the system can process the agent discomfort predictions using a learned function to generate the aggregated discomfort score. For example, the system can learn the function by simulating operation of the vehicle or by operating the vehicle in the real-world. The system can make driving decisions according to the generated aggregated discomfort scores, determine a quality of the driving decisions, and update the learned function according to the determined quality. For example, if a gradient of the quality is available, the system can update the learned function using backpropagation. As a particular example, the system can process the agent discomfort predictions using a random forest or a recurrent neural network.

The system provides the aggregated discomfort score to a path planning system of the vehicle (step 508). The path planning system can process the aggregated discomfort score, and/or each of the individual agent discomfort predictions, to generate a future path of the vehicle.

Figure 6:
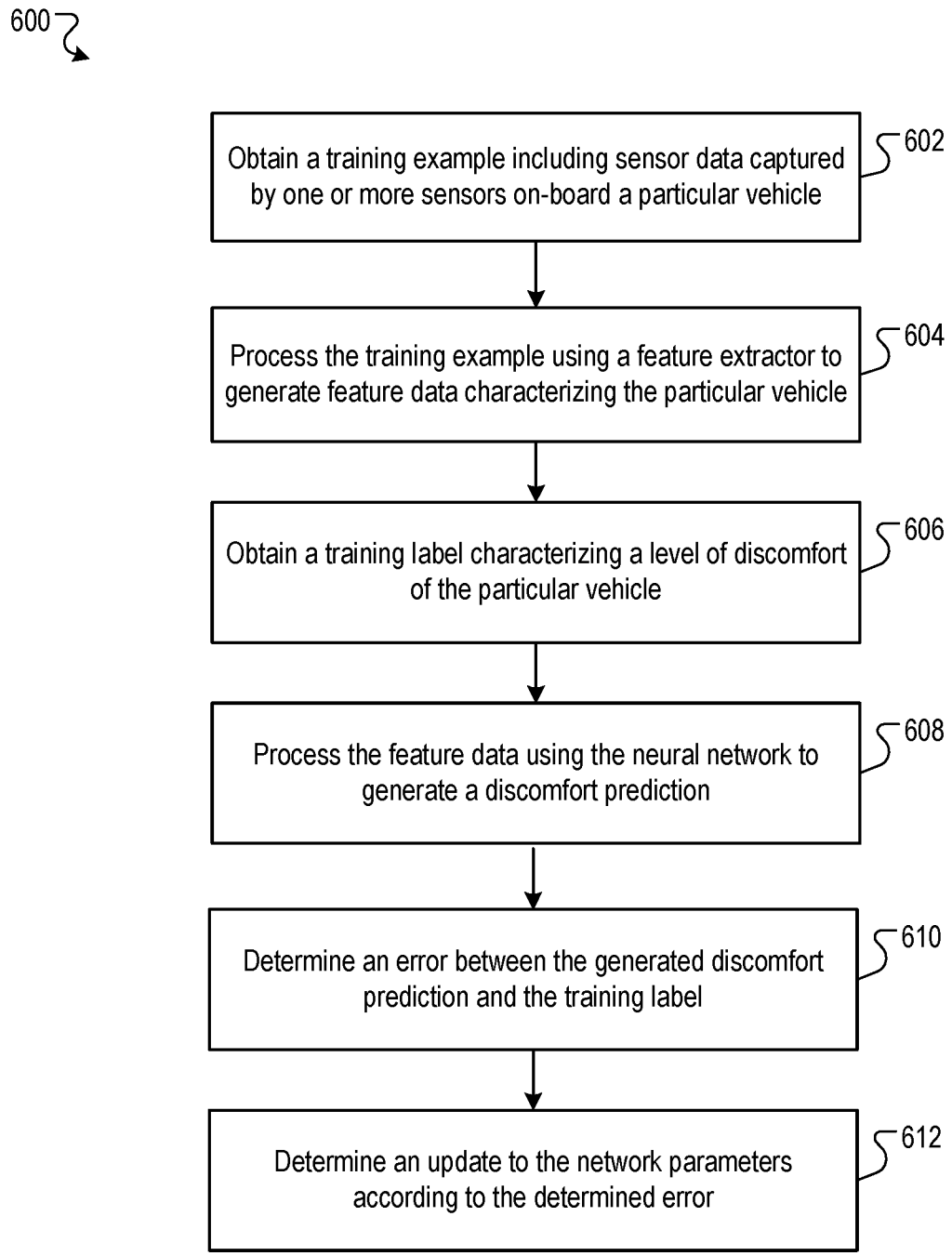
FIG. 6 and FIG. 7 are flow diagrams of examples processes for training a neural network to predict the discomfort imposed on a surrounding agent by a vehicle.

FIG. 6 is a flow diagram of an example process 600 for training a neural network to predict the discomfort imposed on a surrounding agent by a vehicle. For convenience, the process 600 will be described as being performed by a system of one or more computers located in one or more locations. For example, an agent model training system, e.g., the agent model training system 300 depicted in FIG. 3, appropriately programmed in accordance with this specification, can perform the process 600.

The system obtains a training example that includes sensor data captured by one or more sensors on-board a particular vehicle (step 602).

The system processes the training example using a feature extractor to generate feature data characterizing the particular vehicle (step 604).

For example, the feature extractor can generate the feature data using a proper subset of the sensor data, e.g., a subset of the sensor data that corresponds to the particular vehicle (as opposed to surrounding agents, the environment, etc.). That is, the subset of the sensor data characterizes one or more particular characteristics of the particular vehicle. Importantly, the sensor data also includes data corresponding to each surrounding agent that includes the same particular characteristics. Thus, the feature extractor can generate vehicle feature data and agent feature data of the same form. During training, the feature extractor generated vehicle feature data corresponding to the particular vehicle; during inference, the feature extractor can generate agent feature data corresponding to each surrounding agent.

The system obtains a training label characterizing a level of discomfort of the particular vehicle (step 606). For example, the training label can be generated from a user input provided by a user at the time that the sensor data was captured.

The system processes the feature data using the neural network according to current values of the network parameters of the neural network to generate a discomfort prediction (step 608). The discomfort prediction predicts the level of discomfort of the particular vehicle.

The system determines an error between the generated discomfort prediction and the training label (step 610).

The system determines an update to the network parameters of the neural network according to the determined error (step 612)

Figure 7:
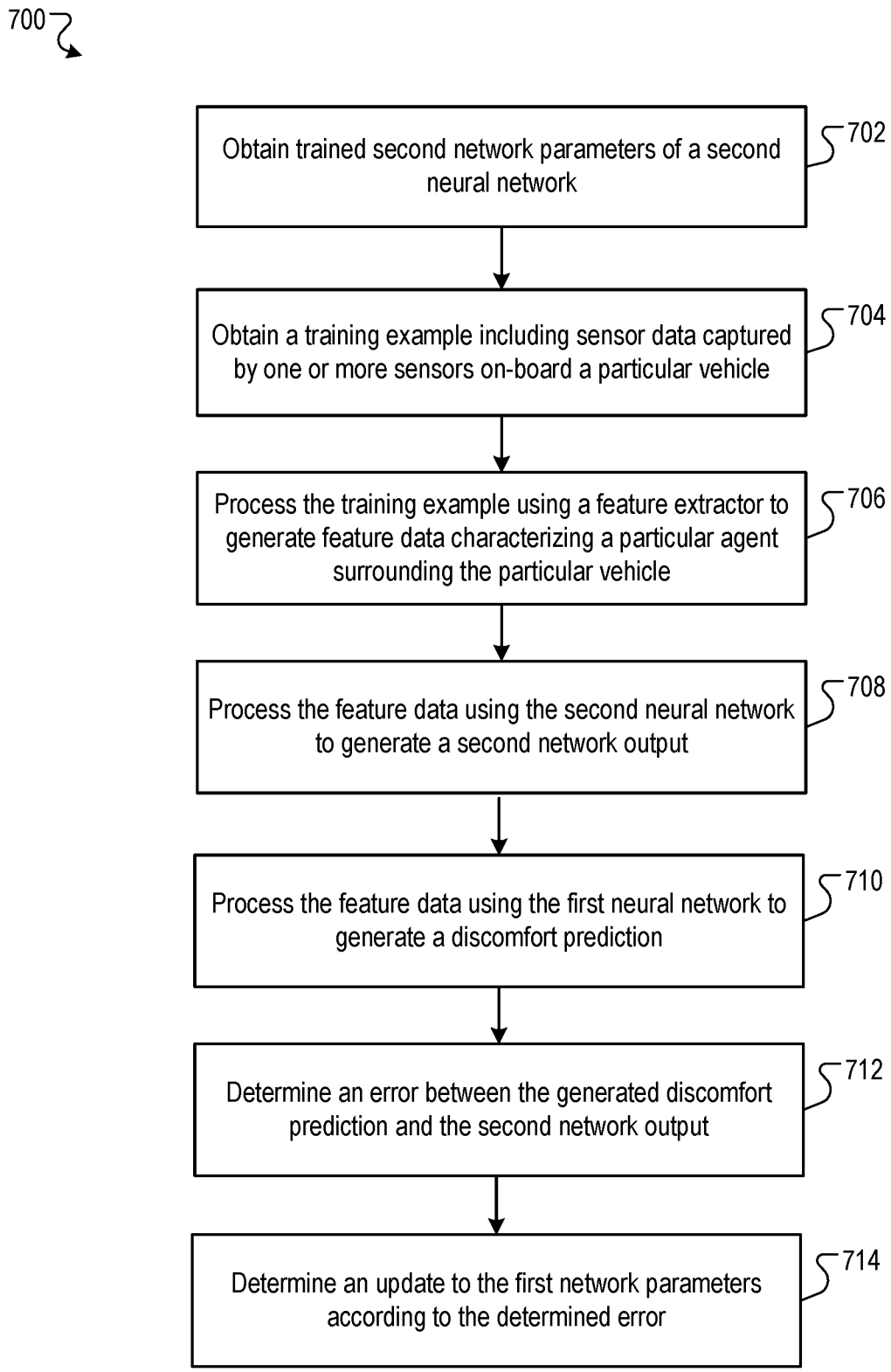

FIG. 7 is a flow diagram of an examples process 700 for training a first neural network having multiple first network parameters to predict the discomfort imposed on a surrounding agent by a vehicle. For convenience, the process 700 will be described as being performed by a system of one or more computers located in one or more locations. For example, an agent model training system, e.g., the agent model training system 400 depicted in FIG. 4, appropriately programmed in accordance with this specification, can perform the process 700.

The system obtains trained second network parameters of a second neural network (step 702). The second neural network is configured to process a second network input generated from sensor data captured by one or more sensors on-board a vehicle in an environment and to generate a second network output characterizing a level of discomfort of the vehicle.

The system obtains a training example that includes sensor data captured by one or more sensors on-board a particular vehicle (step 704).

The system processes the training example using a feature extractor to generate feature data characterizing a particular agent surrounding the particular vehicle (step 706). In some implementations, the feature extractor is the same feature extractor that generates the second network input.

The system processes the feature data using the second neural network to generate a second network output (step 708). The second network output characterizes a level of discomfort of the particular agent and will be used as the training label corresponding to the feature data for training the first neural network.

The system processes the feature data using the first neural network according to current values of the first network parameters to generate a discomfort prediction (step 710).

The system determines an error between the generated discomfort prediction and the second network output (step 712).

The system determines an update to the first network parameters according to the determined error (step 714).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them.

Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
obtaining sensor data characterizing an environment, wherein the sensor data has been captured by one or more sensors on-board a vehicle in the environment;

processing, for each of one or more surrounding agents in the environment, a network input generated from the sensor data using a neural network to generate an agent discomfort prediction that characterizes a level of discomfort of the agent;

combining the one or more agent discomfort predictions to generate an aggregated discomfort score; and providing the aggregated discomfort score to a path planning system of the vehicle in order to generate a future path of the vehicle.

Embodiment 2 is the method of embodiment 1, wherein the network input is a machine-learned network input that was learned concurrently with the training of the neural network.

Embodiment 3 is the method of any one of embodiments 1 or 2, wherein combining the one or more agent discomfort predictions comprises one or more of:

determining an measure of central tendency of the agent discomfort predictions, determining an minimum of the agent discomfort predictions, determining a maximum of the agent discomfort predictions, or processing each agent discomfort prediction using a learned function.

Embodiment 4 is the method of any one of embodiments 1-3, wherein the network input for a particular surrounding agent comprises a top-down image of the environment centered on the particular surrounding agent.

Embodiment 5 is the method of any one of embodiments 1-4, wherein the neural network has been trained using i) training sensor data captured by sensors on-board one or more vehicles operating in the real world and ii) user input identifying a respective comfort level of the vehicles at a plurality of time points during the operation.

Embodiment 6 is the method of any one of embodiments 1-5, wherein for each surrounding agent:

the network input has been generated by processing the sensor data using a feature extractor;

the feature extractor generates the feature data using a proper subset of the sensor data; and the proper subset of the sensor data comprises first data that characterizes one or more particular characteristics of the surrounding agent.

Embodiment 7 is the method of any one of embodiments 1-6, wherein the neural network has been trained using feature distillation using a second neural network that is configured to process a second network input generated from sensor data captured by one or more sensors on-board the vehicle and to generate a second network output characterizing a level of discomfort of the vehicle.

Embodiment 8 is a method of training a first neural network having a plurality of first network parameters and configured to process a first network input generated from sensor data captured by one or more sensors on-board a vehicle in an environment and to generate a first network output comprising an agent discomfort prediction, wherein the agent discomfort prediction characterizes a level of discomfort of an agent surrounding the vehicle in the environment, the method comprising:

obtaining a plurality of trained second network parameters of a second neural network configured to process a second network input generated from sensor data captured by one or more sensors on-board a vehicle in an environment and to generate a second network output characterizing a level of discomfort of the vehicle;

obtaining a training example comprising sensor data captured by one or more sensors on-board a particular vehicle in a particular environment;

processing the training example using a feature extractor to generate feature data characterizing a particular agent surrounding the particular vehicle in the particular environment;

processing the feature data using the second neural network to generate a second network output characterizing a level of discomfort of the particular agent;

processing the feature data using the first neural network according to current values of the plurality of first network parameters to generate a discomfort prediction that characterizes the level of discomfort of the particular agent;

determining an error between the generated discomfort prediction and the second network output; and determining an update to the current values of the plurality of first network parameters according to the determined error.

Embodiment 9 is the method of embodiment 8, wherein:

the feature extractor generates the feature data using a proper subset of the sensor data;

the proper subset of the sensor data comprises first data that characterizes one or more particular characteristics of the vehicle; and the sensor data comprises second data that characterizes the one or more particular characteristics of each surrounding agent in the particular environment.

Embodiment 10 is a system comprising: one or more computers and one or more storage devices storing instructions that are operable, when executed by the one or more computers, to cause the one or more computers to perform the method of any one of embodiments 1 to 9.

Embodiment 11 is a computer storage medium encoded with a computer program, the program comprising instructions that are operable, when executed by data processing apparatus, to cause the data processing apparatus to perform the method of any one of embodiments 1 to 9.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
obtaining sensor data characterizing an environment, wherein the sensor data has been captured by one or more sensors on-board a first vehicle in the environment, wherein the sensor data comprises measures of each of one or more surrounding vehicles in the environment that are different than the first vehicle;
processing, for each of the one or more surrounding vehicles in the environment, a network input generated from the sensor data using a neural network deployed on-board the first vehicle to generate an agent discomfort prediction that characterizes a level of discomfort that the first vehicle is causing a driver or a passenger of the respective surrounding vehicle, wherein each respective surrounding vehicle is different than the first vehicle;
combining the one or more agent discomfort predictions to generate an aggregated discomfort score; and
providing the aggregated discomfort score to a path planning system of the first vehicle in order to generate a future path of the first vehicle.

2. The method of claim 1, wherein the network input is a machine-learned network input that was learned concurrently with the training of the neural network.

3. The method of claim 1, wherein combining the one or more agent discomfort predictions comprises one or more of:
determining a measure of central tendency of the agent discomfort predictions,
determining a minimum of the agent discomfort predictions,
determining a maximum of the agent discomfort predictions, or
processing each agent discomfort prediction using a learned function.

4. The method of claim 1, wherein the network input for a particular surrounding agent comprises a top-down image of the environment centered on the particular surrounding agent.

5. The method of claim 1, wherein the neural network has been trained using i) training sensor data captured by sensors on-board one or more vehicles operating in the real world and ii) user input identifying a respective comfort level of the vehicles at a plurality of time points during the operation.

6. The method of claim 1, wherein for each surrounding agent:
the network input has been generated by processing the sensor data using a feature extractor;
the feature extractor generates the feature data using a proper subset of the sensor data; and
the proper subset of the sensor data comprises first data that characterizes one or more particular characteristics of the surrounding agent.

7. The method of claim 1, wherein the neural network has been trained using feature distillation using a second neural network that is configured to process a second network input generated from sensor data captured by one or more sensors on-board the first vehicle and to generate a second network output characterizing a level of discomfort of the first vehicle.

8. A system comprising one or more computers and one or more storage devices storing instructions that are operable, when executed by the one or more computers, to cause the one or more computers to perform operations comprising:
obtaining sensor data characterizing an environment, wherein the sensor data has been captured by one or more sensors on-board a first vehicle in the environment, wherein the sensor data comprises measures of each of one or more surrounding vehicles in the environment that are different than the first vehicle;
processing, for each of one or more surrounding vehicles in the environment, a network input generated from the sensor data using a neural network deployed on-board the first vehicle to generate an agent discomfort prediction that characterizes a level of discomfort that the vehicle is causing a driver or a passenger of the respective surrounding vehicle, wherein each respective surrounding vehicle is different than the first vehicle;
combining the one or more agent discomfort predictions to generate an aggregated discomfort score; and
providing the aggregated discomfort score to a path planning system of the first vehicle in order to generate a future path of the first vehicle.

9. The system of claim 8, wherein the network input is a machine-learned network input that was learned concurrently with the training of the neural network.

10. The system of claim 8, wherein combining the one or more agent discomfort predictions comprises one or more of:
determining a measure of central tendency of the agent discomfort predictions,
determining a minimum of the agent discomfort predictions,
determining a maximum of the agent discomfort predictions, or
processing each agent discomfort prediction using a learned function.

11. The system of claim 8, wherein the network input for a particular surrounding agent comprises a top-down image of the environment centered on the particular surrounding agent.

12. The system of claim 8, wherein the neural network has been trained using i) training sensor data captured by sensors on-board one or more vehicles operating in the real world and ii) user input identifying a respective comfort level of the vehicles at a plurality of time points during the operation.

13. The system of claim 8, wherein for each surrounding agent:
the network input has been generated by processing the sensor data using a feature extractor;
the feature extractor generates the feature data using a proper subset of the sensor data; and the proper subset of the sensor data comprises first data that characterizes one or more particular characteristics of the surrounding agent.

14. The system of claim 8, wherein the neural network has been trained using feature distillation using a second neural network that is configured to process a second network input generated from sensor data captured by one or more sensors on-board the first vehicle and to generate a second network output characterizing a level of discomfort of the first vehicle.

15. One or more non-transitory computer storage media encoded with computer program instructions that when executed by a plurality of computers cause the plurality of computers to perform operations comprising:
   obtaining sensor data characterizing an environment, wherein the sensor data has been captured by one or more sensors on-board a first vehicle in the environment, wherein the sensor data comprises measures of each of one or more surrounding vehicles in the environment that are different than the first vehicle;
   processing, for each of one or more surrounding agents in the environment, a network input generated from the sensor data using a neural network deployed on-board the first vehicle to generate an agent discomfort prediction that characterizes a level of discomfort that the first vehicle is causing a driver or a passenger of the respective surrounding vehicle, wherein each respective surrounding vehicle is different than the first vehicle;
   combining the one or more agent discomfort predictions to generate an aggregated discomfort score; and
   providing the aggregated discomfort score to a path planning system of the vehicle in order to generate a future path of the first vehicle.

16. The non-transitory computer storage media of claim 15, wherein the network input is a machine-learned network input that was learned concurrently with the training of the neural network.

17. The non-transitory computer storage media of claim 15, wherein combining the one or more agent discomfort predictions comprises one or more of:
   determining a measure of central tendency of the agent discomfort predictions,
   determining a minimum of the agent discomfort predictions,
   determining a maximum of the agent discomfort predictions, or
   processing each agent discomfort prediction using a learned function.

18. The non-transitory computer storage media of claim 15, wherein the neural network has been trained using i) training sensor data captured by sensors on-board one or more vehicles operating in the real world and ii) user input identifying a respective comfort level of the vehicles at a plurality of time points during the operation.

19. The non-transitory computer storage media of claim 15, wherein for each surrounding agent:
   the network input has been generated by processing the sensor data using a feature extractor;
   the feature extractor generates the feature data using a proper subset of the sensor data; and
   the proper subset of the sensor data comprises first data that characterizes one or more particular characteristics of the surrounding agent.

20. The non-transitory computer storage media of claim 15, wherein the neural network has been trained using feature distillation using a second neural network that is configured to process a second network input generated from sensor data captured by one or more sensors on-board the first vehicle and to generate a second network output characterizing a level of discomfort of the first vehicle.

* * * * *